United States Patent
Brown

(10) Patent No.: US 6,714,570 B1
(45) Date of Patent: Mar. 30, 2004

(54) MOLECULAR IODINE SUPPLY SYSTEM FOR A CHEMICAL LASER

(75) Inventor: Lloyd Chauncey Brown, San Diego, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 10/330,727

(22) Filed: Dec. 27, 2002

(51) Int. Cl.[7] .................................................. H01S 3/04
(52) U.S. Cl. ............................ 372/34; 372/89; 372/78; 372/77; 372/59
(58) Field of Search ............................ 372/77, 89, 34, 372/59, 78

(56) References Cited

U.S. PATENT DOCUMENTS

| | | | |
|---|---|---|---|
| 3,646,471 A | * 2/1972 | DeMent ...................... | 372/77 |
| 4,434,492 A | 2/1984 | Benard et al. | |
| 4,961,200 A | * 10/1990 | Verdier et al. ................ | 372/89 |
| 5,289,490 A | * 2/1994 | Taniu et al. .................. | 372/92 |
| 5,693,267 A | 12/1997 | Beshore et al. | |
| 6,377,600 B1 | * 4/2002 | Flegal .......................... | 372/89 |
| 6,621,848 B1 | * 9/2003 | Ullman et al. ................ | 237/89 |

* cited by examiner

Primary Examiner—Leon Scott, Jr.
(74) Attorney, Agent, or Firm—Nydegger & Associates

(57) ABSTRACT

A method for producing molecular Iodine for introduction into the laser cavity of a Chemical-Oxygen-Iodine-Laser (COIL) includes the step of preparing a solid mixture that contains a primary component and an additive component. The solid mixture is formulated to generate a gas having a high concentration of molecular Iodine when ignited. The primary component of the mixture is composed of oxidizer and fuel at a substantially stoichiometric ratio and includes at least one Iodine compound. The additive component is provided to cool the relatively high temperature gas that is created during combustion of the primary component. The result is a gas at a relatively low temperature in which most of the Iodine is present as molecular Iodine. The additive component is preferably an Iodine compound that either absorbs heat during decomposition such as Iodine Pentoxide ($I_2O_5$) or an Iodine compound that absorbs heat during sublimation such as solid Iodine.

20 Claims, 1 Drawing Sheet

MOLECULAR IODINE SUPPLY SYSTEM FOR A CHEMICAL LASER

FIELD OF THE INVENTION

The present invention pertains generally to chemical lasers that use Iodine gas as an input stream. More particularly, the present invention pertains to systems for producing a gas having a high concentration of molecular Iodine for use in a chemical laser. The present invention is particularly, but not exclusively, useful as an on-demand, molecular Iodine gas supply system for an Iodine laser.

BACKGROUND OF THE INVENTION

The Chemical-Oxygen-Iodine-Laser (COIL) is potentially useful for both military and commercial applications because it is capable of producing a high power laser beam. In the COIL process, Iodine gas is combined with singlet delta Oxygen in a laser cavity to produce a laser beam. In most COIL applications, it is preferable to use molecular Iodine at low temperatures, rather than atomic Iodine at high temperatures as an input stream to the laser cavity. In particular, low temperature molecular Iodine is much less corrosive than high temperature atomic Iodine. Iodine is a solid at room temperature. It must therefore be vaporized to produce the Iodine gas required in the COIL laser cavity.

One method for producing Iodine gas involves melting Iodine in an Iodine reservoir. The Iodine vapors that are given off by the molten Iodine are then transported using a carrier gas to the laser cavity through a delivery system. In general, the required delivery system involves piping and other complex parts such as valves, precision orifices, and temperature and pressure instruments. Unfortunately, this method of producing gaseous Iodine has several drawbacks. For instance, the entire delivery system, including the carrier gas, must be preheated and maintained at elevated temperatures to prevent Iodine condensation from plugging the delivery system. For a typical COIL system that is designed for military applications, several hours are required to melt the Iodine and preheat the delivery system. On the other hand, the source for generating the singlet delta Oxygen that is to be combined with the Iodine gas requires, only a fraction of a minute to reach operational status.

In the molten and gaseous states, Iodine is extremely corrosive. Because of Iodine's corrosivity, equipment exposed to Iodine, such as the Iodine reservoir and delivery system described above, must be fabricated from expensive materials such as Hastelloy C-276. In addition to degrading any exposed equipment, the corrosion reaction will, with time at temperature, contaminate the Iodine in the reservoir, requiring the Iodine in the reservoir to be periodically purified or discarded. Impurities in the Iodine must be maintained at very low levels as they may be transported to the laser cavity where they can coat the optical components. For military applications, where readiness is important, a reservoir of molten Iodine would be required at all times, leading to a significant amount of corrosion. Furthermore, the delivery system valves, which must be operated hot and in the presence of Iodine will deteriorate with time at temperature and leak allowing corrosive Iodine to escape. Such a leak could be potentially harmful to electronic equipment. For these reasons, in order to perform routine maintenance on the molten Iodine reservoir and delivery system, these systems must be periodically shut down and allowed to cool. Additionally, maintenance of liquid Iodine systems creates a large amount of Iodine contaminated waste that requires special handling and disposal. In summary, the molten Iodine reservoir and delivery system is large, heavy, costly and complex.

The present invention recognizes that a gas containing Iodine can be generated by the combustion of a solid, fuel/oxidizer mixture that contains Iodine. The Iodine compound can be present in either the oxidizer, the fuel or both. By using a solid source of Iodine, the problems associated with the use of liquid Iodine are prevented and a supply of gaseous Iodine can be quickly produced. An example of a fuel/oxidizer system that can be combusted to produce gaseous Iodine is $Cl_4$ fuel and Iodine Pentoxide ($I_2O_5$) oxidizer. Unfortunately, when a stoichiometric ratio of this fuel/oxidizer mixture is ignited, the resulting combustion reaction is very exothermic, producing a high temperature combustion gas that contains mostly atomic Iodine. In general, for Iodine containing gases at high temperatures, most of the Iodine is present as atomic Iodine, whereas at lower gas temperatures, most of the Iodine is present as molecular Iodine. As indicated above, for most COIL applications, it is preferable to use molecular Iodine gas as an input stream.

In light of the above, it is an object of the present invention to provide a system for generating a gas having a high concentration of molecular Iodine for use in a chemical laser. It is another object of the present invention to provide an on-demand, molecular Iodine gas supply system for a chemical laser that does not require a liquid Iodine reservoir to be maintained during periods of non-demand. It is still another object of the present invention to provide a gas, a chemical laser having a higher concentration of molecular Iodine than is obtained during combustion of a stoichiometric ratio of a solid, Iodine containing fuel and oxidizer system. Yet another object of the present invention is to provide an on-demand, molecular Iodine gas supply system which is easy to use, relatively simple to implement, and comparatively cost effective.

SUMMARY OF THE INVENTION

The present invention is directed to a method for generating a gas having a relatively high concentration of molecular Iodine for introduction into the laser cavity of an Iodine laser such as a Chemical-Oxygen-Iodine-Laser (COIL) or the All Gas Iodine Laser (AGIL). In the laser cavity, the molecular Iodine gas can be used to efficiently produce a high power laser beam. For example, in the COIL, the molecular Iodine gas can be combined with singlet delta Oxygen to produce a laser beam. For the present invention, the method includes the step of preparing a solid mixture that can be ignited to generate a gas having a high concentration of molecular Iodine.

In accordance with the present invention, the solid mixture contains a primary component and an additive component. The primary component of the mixture is composed of oxidizer and fuel at a substantially stoichiometric ratio. For the present invention, the primary component contains at least one Iodine compound. The Iodine compound can be present in either the oxidizer, the fuel or both. As such, the primary component of the mixture defines a combustion gas composition (i.e. the molecular Iodine concentration of the gas obtained if the primary component, alone, is ignited). Furthermore, this combustion gas composition has a specific molecular Iodine concentration. In this same manner, the primary component also defines a primary component combustion gas temperature (i.e. the temperature of the gas obtained if the primary component, alone, is ignited).

Examples of fuel/oxidizer systems that can be used in the present invention include; $Cl_4$/Iodine Pentoxide ($I_2O_5$), $Cl_4$/$NH_4NO_3$ and Polybutadiene/Iodine Pentoxide ($I_2O_5$). When these fuel/oxidizer systems are ignited, the resulting combustion reaction is very exothermic, producing a high temperature combustion gas. At this high temperature, most of the Iodine is present as atomic Iodine. For the present invention, the mixture includes an additive that causes the mixture to produce a lower temperature combustion gas than would be produced by the primary component when combusted alone. In the lower temperature combustion gas, most of the Iodine is present as molecular Iodine rather than atomic Iodine. As indicated above, molecular Iodine is favored by the COIL system. Thus, the solid mixture with the additive component produces a combustion gas having a higher molecular Iodine concentration than is obtained by combustion of the primary component alone. Stated another way, the gas resulting from ignition of the mixture (with the additive component) has a higher molecular Iodine concentration and lower temperature than the gas resulting from the ignition of the stoichiometric ratio of the fuel and oxidizer used to prepare the primary component of the mixture.

In one preferred embodiment of the present invention, the additive component is an Iodine compound that absorbs heat during decomposition. For example, Iodine Pentoxide ($I_2O_5$), which absorbs heat during decomposition into Iodine and Oxygen, can be used as the additive component. It is to be appreciated that when Iodine Pentoxide ($I_2O_5$) is used as the additive, a lean, non-stoichiometric mixture results. One advantage of using Iodine Pentoxide ($I_2O_5$) as the additive is that additional molecular Iodine is added to the combustion gas by the decomposition of the Iodine Pentoxide ($I_2O_5$). In another preferred embodiment of the present invention, the additive component is an Iodine compound that absorbs heat during sublimation. One example of an Iodine compound that absorbs heat during sublimation is solid Iodine. The use of solid Iodine as the additive also increases the molecular Iodine in the combustion gas due to the molecular Iodine that results from the sublimation of the solid Iodine.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
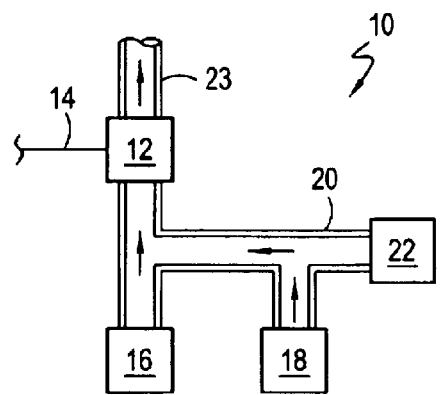
FIG. 1 is a schematic of a Chemical-Oxygen-Iodine-Laser (COIL) system in accordance with the present invention.

Referring initially to FIG. 1, a Chemical-Oxygen-Iodine-Laser (COIL) system in accordance with the present invention is shown and generally designated 10. As shown in FIG. 1, the system 10 includes a laser cavity 12 for producing a laser beam 14. As further shown, a singlet delta Oxygen supply 16 is provided to introduce singlet delta Oxygen into the laser cavity 12. System 10 further includes an on-demand, molecular Iodine supply 18 for generating a gas having molecular Iodine as its primary constituent for use in the laser cavity 12. As shown, delivery piping 20 is provided to transport Iodine gas from the Iodine supply 18 to the laser cavity 12. An optional carrier gas supply 22, such as a Nitrogen gas generator, can be provided to promote Iodine flow through the delivery piping 20. An exhaust line 23 is provided to route exhaust gases from the laser cavity 12. If desired, these exhaust gases can be routed via line 23 to an Iodine recycle system or scrubber (not shown).

Figure 2:
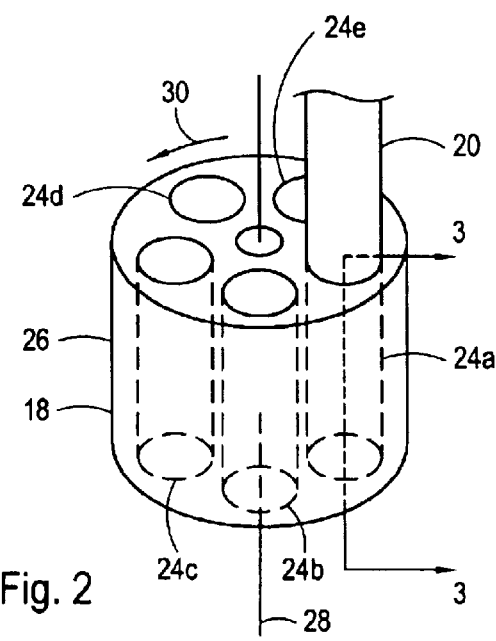
FIG. 2 is a perspective view of an Iodine gas on-demand supply system showing a plurality of Iodine supply cartridges disposed in a revolver housing to allow for the rapid exchange of Iodine supply cartridges.

Referring now to FIG. 2, a preferred embodiment of an on-demand, molecular Iodine supply 18 in accordance with the present invention is shown. As shown, the molecular Iodine supply 18 includes a plurality of Iodine supply cartridges 24a–e disposed in a cylindrical revolver housing 26. In accordance with the present invention, the revolver housing 26 can be rotated about axis 28 in the direction of arrow 30 to successively align each cartridge 24a–e with the delivery piping 20 to rapidly replace each cartridge 24a–e after its use. It is contemplated that only a few seconds will lapse between successive firing of cartridges 24a–e.

Figure 3:
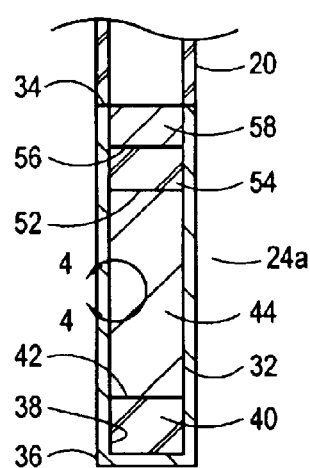
FIG. 3 is a sectional view of an Iodine supply cartridge and a portion of a delivery pipe as seen along line 3—3 in FIG. 2.

With reference now to FIG. 3, it can be seen that the cartridge 24a includes a substantially non-combustible casing 32 that is formed as a hollow cylinder. The casing 32 is formed with an open end 34 and a closed end 36 and preferably has a cylindrically shaped inner, surface 38. As shown, delivery piping 20 is positioned adjacent to the casing 32 at the open end 34. In the preferred embodiment of the present invention, a solid, Iodine-free purge material 40 is disposed in the casing 32, filling the casing 32 from the closed end 36 of the casing 32 to a first interface 42. As such, the purge material 40 conforms to the shape of the inner surface 38 of the casing 32. For the present invention, the purge material 40 consists of an Iodine-free, solid material that produces a relatively inert gas when ignited. In a preferred embodiment of the present invention, a mixture of Ammonium Nitrate and Oxalic Acid is used as the purge material 40 to produce a mixture of Nitrogen, water vapor, Carbon Monoxide and Carbon Dioxide gases.

Figure 4:
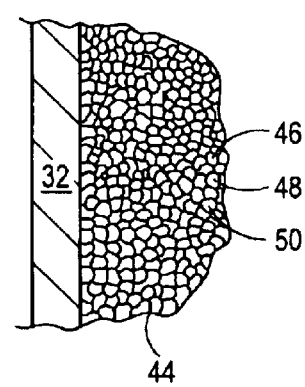
FIG. 4 is an enlarged, sectional view of a portion of an Iodine supply cartridge showing the components of an Iodine containing mixture in accordance with the present invention as seen along line 4—4 in FIG. 3.

With cross reference now to FIGS. 3 and 4, it can be seen that the cartridge 24a also includes a solid mixture 44 that is composed of fuel 46, oxidizer 48 and an additive component 50. Preferably, the mixture 44 is formulated to produce gas having a high concentration of molecular Iodine and little or no solid residue, when ignited. Importantly, the mixture 44 contains Iodine. In the mixture 44, the Iodine can be present in the fuel 46 (such as $C_2I_4$), the oxidizer 48 (such as Iodine Pentoxide ($I_2O_5$)) and/or the additive component 50 (such as solid Iodine). Table 1 below shows suitable systems of fuel 46 and oxidizer 48 for use in the mixture 44.

TABLE 1

| Fuel | Oxidizer | Fabrication Techniques |
|---|---|---|
| Polystyrene | $I_2O_5$ | Castable system |
| Polybutadiene | $I_2O_5$ | Castable system |
| $CI_4$ | $I_2O_5$ | Pelletized system |
| $C_6I_6$ | $I_2O_5$ | Pelletized system |
| $CHI_3$ | $I_2O_5$ | Pelletized system |
| CIN | $I_2O_5$ | Pelletized system |
| $CHI_3$ | $NH_4IO_3$ | Pelletized system |

TABLE 1-continued

| Fuel | Oxidizer | Fabrication Techniques |
|---|---|---|
| $CI_4$ | $NH_4IO_3$ | Pelletized system |
| $CI_4$ | $NH_4NO_3$ | Pelletized system |
| $C_2I_4$ | $I_2O_5$ | Pelletized system |
| Sn | $I_2O_5$ | Pelletized system |

A first preferred mixture 44 for the present invention includes $C_2I_4$ as the fuel 46 and Iodine Pentoxide ($I_2O_5$) as the oxidizer 48, at a stoichiometric ratio, in combination with an additive component 50. The stoichiometric products upon reaction of this fuel 46 and oxidizer 48 are Iodine and Carbon Dioxide. Another preferred mixture 44 for the present invention includes $C_2I_4$ as the fuel 46 and $NH_4NO_3$ as the oxidizer 48, at a stoichiometric ratio, in combination with an additive component 50. A third preferred mixture 44 for the present invention includes Polybutadiene as the fuel 46 and Iodine Pentoxide ($I_2O_5$) as the oxidizer 48, at a stoichiometric ratio, in combination with an additive component 50.

Upon ignition of these systems of fuel 46 and oxidizer 48, the resulting combustion reaction is very exothermic, producing a high temperature combustion gas. For an Iodine containing, combustion gas at this high temperature, most of the Iodine is present as atomic Iodine. In accordance with the present invention, the mixture 44 includes an additive component that causes the mixture 44 to produce a lower temperature combustion gas than would be produced by the combustion of a stoichiometric ratio of fuel 46 and oxidizer 48 alone. In the lower temperature combustion gas, most of the Iodine is present as molecular Iodine rather than atomic Iodine. As indicated above, molecular Iodine is favored by the COIL system 10 (shown in FIG. 1). Thus, the solid mixture 44 with the additive component 50 increases the molecular Iodine concentration in the combustion gas.

In one preferred embodiment of the present invention, the additive component 50 is an Iodine compound that absorbs heat during decomposition. For example Iodine Pentoxide ($I_2O_5$), which absorbs heat during decomposition into Iodine and Oxygen can be used as the additive component 50. It is to be appreciated that when Iodine Pentoxide ($I_2O_5$) is used as the additive, a lean, non-stoichiometric mixture 44 results. One advantage of using Iodine Pentoxide ($I_2O_5$) as the additive component 50 is that additional molecular Iodine is added to the combustion gas by the decomposition of the Iodine Pentoxide ($I_2O_5$). In another preferred embodiment of the present invention, the additive component 50 is an Iodine compound that absorbs heat during sublimation. One example of an Iodine compound that absorbs heat during sublimation is solid Iodine. The use of solid Iodine as the additive component 50 also increases the molecular Iodine in the combustion gas due to the molecular Iodine that results from the sublimation of the solid Iodine.

Preferably, the mixture 44 is formulated and compounded to produce a gas having molecular Iodine as its major constituent when ignited. The mixture 44 is further formulated so that other constituents in the gas, such as Nitrogen, Carbon Dioxide and water, are not present in concentrations that will interfere with the COIL process. Due to the exothermic nature of the combustion of the mixture 44, continued heating of the delivery piping 20 (after preheat) to prevent Iodine condensation is generally not required. For example, a stoichiometric mixture of $CI_4$ and $I_2O_5$ has a calculated combustion gas temperature of approximately 1693° C. It is to be further appreciated that the temperature of the Iodine entering the laser cavity 12 (shown in FIG. 1) can be altered by varying the composition or temperature of the carrier gas 22 (shown in FIG. 1). In general, for the COIL process, it is desirable to deliver molecular Iodine to the laser cavity 12 at a temperature of approximately 160° C., diluted with Nitrogen or Helium.

Referring still to FIG. 3, it can be seen that the mixture 44 containing Iodine is disposed in the casing 32, filling the casing 32 from the first interface 42 to a second interface 52. As such, the mixture 44 conforms to the shape of the inner surface 38 of the casing 32 and is in direct contact with the purge material 40 at the first interface 42. Casting or pelletizing methods can be used to prepare the solid, conforming mixture 44. In the casting method, a slurry or paste of an inorganic solid oxidizer 48 containing Iodine with a monometer (fuel 46) is prepared. A catalyst is added and the mixture 44 is poured into the casing 32 where the manometer polymerizes, binding the constituents into a solid mass that conforms to the inner surface 38 of the casing 32. In the pelletizing method, the oxidizer 48 and fuel 46 are blended together forming pellets. The pellets are then inserted into the casing 32, producing a solid mass that significantly conforms to the inner surface 38 of the casing 32.

With reference to FIG. 3, it is shown that the cartridge 24a also preferably includes an Iodine-free, solid preheat material 54. As shown, the preheat material 54 is disposed in the casing 32 filling the casing 32 from the second interface 52 to a third interface 56. As such, the preheat material 54 conforms to the shape of the inner surface 38 of the casing 32. Furthermore, the preheat material 54 and the mixture 44 containing Iodine are in direct contact with each other at the second interface 52. For the present invention, the preheat material 54 can be any suitable material that can be ignited to produce an elevated temperature gas. The gas, in turn, is used to preheat the delivery piping 20 to prevent Iodine condensation in the delivery piping 20 during combustion of the mixture 44. Preferably, the elevated temperature gas preheats the delivery piping 20 above the melting point of Iodine (114° C.) to prevent plugging of the delivery piping 20.

It is further shown in FIG. 3 that the cartridge 24a preferably includes an ignitor squib 58 that is disposed in the casing 32 near the open end 34 of the casing 32 and is in direct contact with the preheat material 54. With this combination of structure, the ignitor squib 58 can be activated to initiate a burn front that travels sequentially through the preheat material 54, the Iodine containing mixture 44 and the purge material 40. More specifically, the cartridge 24a is configured to uniformly pass a controlled burn front from the open end 34 of the casing 32 to the closed end 36 of the casing 32.

The operation of the COIL system 10 can best be appreciated with initial combined reference to FIGS. 2 and 3. Initially, an unused cartridge 24a–e is aligned with the delivery piping 20. Next, when a laser beam 14 is required, the ignitor squib 58 can be activated to initiate a burn front that travels sequentially through the preheat material 54, the Iodine containing mixture 44 and the purge material.40. As the burn front passes through the preheat material 54, gases at elevated temperatures are generated that exit the cartridge 24a through the open end 34 of the casing 32 and flow through the delivery piping 20. These hot gases heat the delivery piping 20 to a temperature sufficient to prevent Iodine gas condensation in the delivery piping 20.

Once the preheat material 54 is vaporized and removed from the casing 32, the burn front passes through the Iodine containing mixture 44, igniting the mixture 44 and generating molecular Iodine gas. The molecular Iodine gas then exits the casing 32 through the open end 34 and flows through the preheated delivery piping 20 to the laser cavity 12 (see FIG. 1). During molecular Iodine gas generation, the carrier gas supply 22 can be activated to assist the flow of Iodine to the laser cavity 12 or alter the temperature or composition of the Iodine flow. The singlet delta Oxygen supply 16 can be activated using techniques well known in the art to deliver singlet delta Oxygen to the laser cavity 12 to react with the molecular Iodine to produce a laser beam 14. It is to be appreciated that the flow rate of Iodine gas and the period of Iodine gas generation can be selectively altered by varying the dimensions of the solid mixture 44 and the casing 32. Furthermore, the aspect ratio of the mixture 44 in the cartridge 24a can be selected to ensure a smooth uniform burn that generates a uniform flow rate of molecular Iodine gas for a fixed time.

Once the burn front has traversed the Iodine containing mixture 44 and the entire mixture 44 is vaporized and removed from the casing 32, the burn front passes through the purge material 40, igniting the purge material 40 and generating an Iodine-free, purge gas. The purge gas then exits the casing 32 through the open end 34 and flows through the delivery piping 20 to remove any traces of corrosive Iodine from the delivery piping 20. With the first cartridge 24a depleted, the revolver housing 26 can be rotated to align another cartridge 24b–e with the delivery piping 20 to repeat the above-described process.

While the Molecular Iodine Supply System For a Chemical Laser as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for generating a laser beam, said method comprising the steps of:
    providing a laser cavity;
    providing a solid mixture, said mixture including a fuel, an oxidizer and an additive, wherein at least one of said fuel and said oxidizer contains an Iodine compound;
    igniting said mixture to produce a combustion gas containing atomic Iodine, and to cause said additive to undergo an endothermic chemical change for cooling said combustion gas and converting at least a portion of said atomic Iodine in said combustion gas to molecular Iodine;
    delivering said molecular Iodine to said laser cavity; and
    using said molecular Iodine in said laser cavity to generate said laser beam.

2. A method as recited in claim 1 wherein said additive comprises Iodine Pentoxide ($I_2O_5$).

3. A method as recited in claim 1 wherein said additive comprises solid Iodine.

4. A method as recited in claim 1 wherein said fuel comprises $Cl_4$ and said oxidizer comprises Iodine Pentoxide ($I_2O_5$).

5. A method as recited in claim 4 wherein said additive comprises Iodine Pentoxide ($I_2O_5$).

6. A method as recited in claim 1 wherein said fuel comprises $Cl_4$ and said oxidizer comprises $NH_4NO_3$.

7. A method as recited in claim 1 wherein said fuel comprises Polybutadiene and said oxidizer comprises Iodine Pentoxide ($I_2O_5$).

8. A system for generating a laser beam, said system comprising:
    a laser cavity;
    a solid mixture, said mixture including a fuel, an oxidizer and an additive, wherein at least one of said fuel and said oxidizer contains an Iodine compound;
    a means for igniting said mixture to produce a combustion gas containing atomic Iodine, and to cause said additive to undergo an endothermic chemical change for cooling said combustion gas and converting at least a portion of said atomic Iodine in said combustion gas to molecular Iodine;
    a means for delivering said molecular Iodine to said laser cavity; and
    a means for converting said molecular Iodine to excited atomic Iodine to lase in said laser cavity and generate said laser beam.

9. A system as recited in claim 8 further comprising a casing formed with an open end and a closed end, and wherein said mixture is disposed in said casing.

10. A system as recited in claim 9 further comprising:
    a delivery pipe in fluid communication with said open end of said casing;
    a solid preheat material disposed in said casing between said mixture and said open end of said casing; and
    a means for igniting said preheat material to heat said delivery pipe.

11. A system as recited in claim 9 further comprising:
    a delivery pipe in fluid communication with said open end of said casing; and
    a solid purge material disposed in said casing between said mixture and said closed end of said casing, said purge material for ignition by said mixture to create a purge gas for exit from said open end of said casing and transit through said delivery pipe to flush gaseous Iodine from said delivery pipe.

12. A system as recited in claim 8 wherein said additive is selected from the group consisting of Iodine Pentoxide ($I_2O_5$) and solid Iodine.

13. A system as recited in claim 8 wherein said fuel comprises $Cl_4$ and said oxidizer comprises Iodine Pentoxide ($I_2O_5$).

14. A system as recited in claim 13 wherein said additive comprises Iodine Pentoxide ($I_2O_5$).

15. A system as recited in claim 8 wherein said fuel comprises $Cl_4$ and said oxidizer comprises $NH_4NO_3$.

16. A system as recited in claim 8 wherein said fuel comprises Polybutadiene and said oxidizer comprises Iodine Pentoxide ($I_2O_5$).

17. A system as recited in claim 8 wherein said means for converting said molecular Iodine comprises a source of singlet delta Oxygen.

18. An apparatus for supplying molecular Iodine, said apparatus comprising:
    a solid mixture, said mixture including a fuel, an oxidizer and an additive, wherein at least one of said fuel and said oxidizer contains an Iodine compound; and
    a means for igniting said mixture to produce a combustion gas containing atomic Iodine, and to cause said additive to undergo an endothermic chemical change for cooling said combustion gas and converting at least a portion of said atomic Iodine in said combustion gas to molecular Iodine.

19. An apparatus as recited in claim 18 further comprising a casing formed with an open end and a closed end, and wherein said mixture is disposed in said casing.

20. An apparatus as recited in claim 18 wherein said additive is selected from the group consisting of Iodine Pentoxide ($I_2O_5$) and solid Iodine, said fuel is selected from the group consisting of $Cl_4$ and Polybutadiene, and said oxidizer is selected from the group consisting of Iodine Pentoxide ($I_2O_5$) and $NH_4NO_3$.

* * * * *